United States Patent [19]
Gilker

[11] 3,880,993
[45] Apr. 29, 1975

[54] PROCESS FOR THE FILTRATION OF A SUSPENSION CONTAINING A PROTEIN SUCH AS AN INFLUENZA VIRUS VACCINE

[75] Inventor: Jean-Claude Gilker, Montreal, Quebec, Canada

[73] Assignee: Institut de Microbiologie et d'Hygiene de Montreal, Laval-des-Rapides, Quebec, Canada

[22] Filed: Dec. 4, 1972

[21] Appl. No.: 311,883

[52] U.S. Cl................................. 424/89; 195/1.5
[51] Int. Cl. ...................... A61k 23/00; C12k 7/00
[58] Field of Search........................ 424/89; 195/1.5

[56] References Cited
UNITED STATES PATENTS 3,061,518  10/1962  Auerswald et al.................. 195/1.5
3,228,876   1/1966  Mahon.............................. 195/1.5
3,485,718  12/1969  Baker............................... 195/1.5
3,514,374   5/1970  McAleer et al..................... 195/1.5

Primary Examiner—Sam Rosen
Attorney, Agent, or Firm—Bacon & Thomas

[57] ABSTRACT

The invention is directed to a process for the filtration of a suspension containing a protein, such as an influenza vaccine. The process comprises adding gelatine to the suspension and filtering the gelatine containing suspension of protein or influenza virus vaccine, as the case may be, through a filtering press while keeping a constant flow rate of the gelatine containing suspension which is being filtered through the filtering press.

11 Claims, 1 Drawing Figure

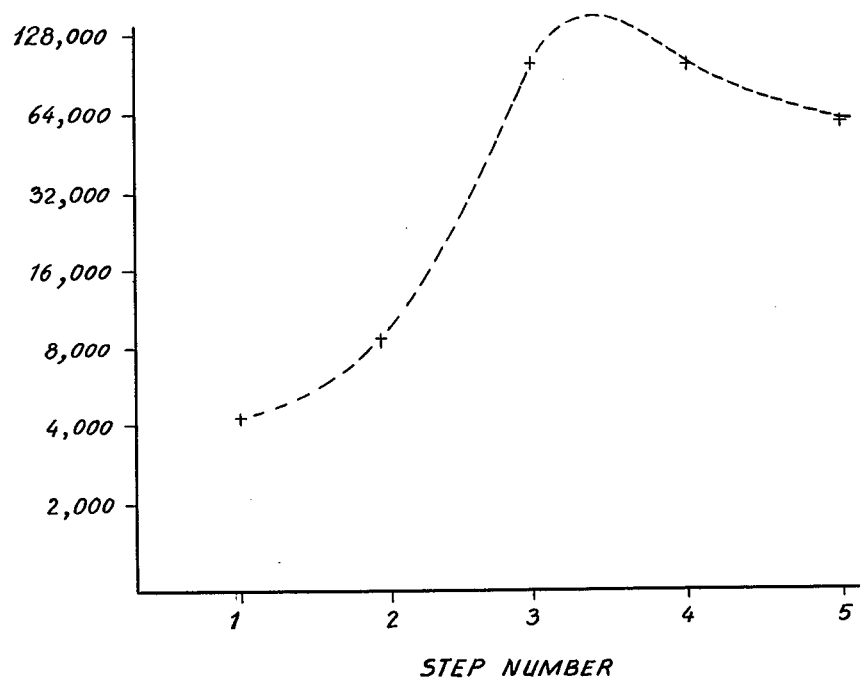

PROCESS FOR THE FILTRATION OF A SUSPENSION CONTAINING A PROTEIN SUCH AS AN INFLUENZA VIRUS VACCINE

This invention relates to a process for the filtration of a suspension containing a protein, such as an influenza virus vaccine.

Almost every biologist must, one day or another in his career, use filtration on fine pore size membrane. For almost everybody, the main object is to remove bacterial contaminant from a biological preparation. For those engaged in pure research, the main problem is the decontamination and if this is achieved this is all very satisfactory. But for those who are engaged in production work, not only must the decontamination be complete, but also the biological activity of the filtered preparation must not be altered in the sense that the yield of the final product must be as high as possible.

Very little is known in the art concerning the filtration of virus suspensions. In 1964 Atoynatan (Atoynatan T., et al, Ultrafiltration of Simian Viruses, Proceedings of the Society for Experimental Biology and Medicine, Vol. 116, pp. 852–856, 1964) reported the use of Millipore and Gradocol membranes in determining the size of several groups of Simian viruses. His data indicates that the recovery of a virus in Millipore filtrates is more nearly quantitative than that obtained in Gradocol filtrates of comparable porosity.

Cliver in 1965 (D. O. Cliver, Factors in the Membrane Filtration of Enterovirus, Applied Microbiology, Vol. 13, No. 3, pp. 417–425, 1965) while working with enteroviruses found that the retention of particles of virus in Millipore or Gelman membrane could be overcome to some extent by adding 4 percent gelatine in medium 199. Bovine or chicken serum could be used but at much higher concentrations. It is also obvious that virus retention is higher in smaller diameter filter membranes than in larger ones. A summary of reports relating to the diameter of the virus particles to the limiting pore diameters has been made by Black in 1952 (Black F. L., Relationship between Virus Particle size and Filterability through Gradocol membranes, Virology, Vol. 5, pp. 391–392, 1952).

In my copending application Ser. No. 311,882, filed Dec. 4, 1972, I have described a virus purification process which is carried out by continuous flow gradient centrifugation. The last step of the process defined in my above noted copending application includes the removal of all bacterial contaminants from a concentrated virus pool containing an average of 25 to 30% sucrose in a TRIS-EDTA buffer. This step was difficult and complicated to carry out by standard filtrating methods. It was not possible to use the prior art referred to above in order to come up with a satisfactory filtrating technique.

It is therefore an object of the present invention to provide a satisfactory filtration of a suspension of protein.

It is another object of the present invention to remove all bacterial contaminants from a suspension of virus.

It is yet another object of the present invention to provide a method by means of which the virus recovery from a suspension thereof is as high as possible.

The invention is directed to a process for the filtration of a suspension containing a protein, such as an influenza virus vaccine. The process comprises adding gelatine to the suspension and filtering the gelatine containing suspension of protein or influenza virus vaccine, as the case may be, through a filtering press while keeping a constant flow rate of the gelatine containing suspension which is being filtered through the filtering press.

As indicated above, the process according to the present invention can be used for filtrating any type of suspensions containing a protein. It will however be obvious that the present process will find particular interest when used in connection with a suspension containing a virus, such as an influenza virus vaccine.

In the particular case just mentioned, the suspension usually contains about 25 to 35 percent sucrose, preferably 30.6 percent sucrose, and a TRIS-EDTA buffer which is present in an amount sufficient to maintain the pH of the suspension at about 7.8. The term TRIS means tris(hydroxymethyl) aminoethane and the term EDTA means ethylene diamine tetraacetic acid.

The flow rate of the suspension which is being filtered is preferably maintained constant by applying an air pressure to the suspension. It is usually necessary for this purpose to continuously increase the air pressure, such as by gradually increasing it from about 10 to about 100 pounds per square inch. While doing this, care should be exercised to keep the flow rate constant.

In accordance with another embodiment of the invention, before the filtering step, Merthiolate (sodium ethyl mercurithiosalicylate trademark) is added to the suspension as an antibacterial agent. The amount used can vary within certain limits as long as the purpose is attained. However it has been found preferable to add it in amount such that a final concentration of about 1/10,000 is reached.

The gelatine can be added in any amounts. The lower limit can vary provided there is some gelatine in the suspension, such as 0.1 percent. However it is preferred to add 0.2 percent gelatine. This amount has proven to be quite economical and has been found to give ultimate filtrating conditions by avoiding non specific adsorption. Amounts less than 4 percent are acceptable, the preferred ranged being 0.1 to 2 percent by weight.

Though it is not intented to be limited by theoretical considerations, it is belived that gelatine will act as an antiadsorbant on the filtering membranes by modifying the electric charges.

The filtering press which is used for filtering the suspension preferably contains a stack of membranes of downwardly decreasing porosities, over which a pre-filter is disposed. The pre-filter is generally made of glass wool and considerable success has been achieved by using the AP 25 Millipore pre-filter.

Better results were obtained when using membranes having a diameter between about 140 and 300 mm. 142 and 293 mm. membranes have given excellent results.

The invention will now be illustrated by means of the following experiments.

There were prepared lots of one thousand ml. of purified influenza virus suspension containing varying concentration of gelatine from 0 percent up to 4.0 percent. As usual these purified preparations contained sucrose in the concentration of about 30 percent in TRIS-EDTA buffer. In each case these preparations were filtered on identical stacks of Millipore membranes of 142 mm. diameter. Filters stacks were built in the following manner: at the top an AP 25 pre-filter, followed dowwardly by the following filter membranes: one 8.0μm. one 3.0μm, one 1.2μm, one 0.8μm, one 0.45μm and 0.22μm filter membranes. Tests made on Sartorius and Gelman membranes gave the same results. Sartorius, Millipore and Gelman are trademarks. Millipore and Selman membranes are formed of cellulose derivatives, more specifically Millipore membranes are formulated primarily of cellulose nitrate and Selman membranes of cellulose acetate.

Before initiating the experiments, Merthiolate was added to a concentration of 1/10,000. In one set of experiments, the viral suspension was pushed through the filter press under 20 pounds of air pressure. The application of pressure initiated a substantially fast flow through the filter stack at the beginning, but very soon this flow decreases and eventually stops after successfully filtering from 300 to 600ml. Titration of the supernatant gave titers representing from 12 percent to 50 percent of the original titer, the titer being higher for higher concentration of gelatine.

In the second set of experiments it was tried to maintain a constant flow of the viral suspension through the filter stack by increasing the pressure when needed. In a typical experiment the virus flow was initiated under a pressure of 20 pounds. When the flow started to decrease, the air pressure was increased to maintain the initial rate of flow. In some cases, the pressure had to be increased up to 95 pounds of air pressure to maintain the flow rate. As can be seen in the right hand part of Table I this technique proved to be very successful. Without gelatine the yield was about 12 percent, but with a gelatine concentration over 0.1 percent, the yield was almost always about 100 percent.

These results are confirmed by daily routine work. The virus suspension may contain sucrose or not, or the virus may be active or inactive, as far as the viral suspension contains more than 0.1 percent gelatine and the flow rate is kept constant, the yield is nearly always 100 percent. If by accident, the air pressure drops and the flow stops, it is impossible to start it again if more than 500 ml have been filtered.

TABLE I

Effect of the concentration of gelatine on virus recovery in filtration on 142mm Millipore membranes

| Gelatine % | Original Ha titer | Fixed pressure Variable flow rate | | Variable pressure Fixed flow rate | |
|---|---|---|---|---|---|
| | | HA/ml | Volume Filtered | HA/ml | Volume Filtered |
| 0.0 | 64000 | 8192 | 450 ml | 8192 | 1000 ml |
| 0.1 | 64000 | 16000 | 330 ml | 32000 | 1000 ml |
| 0.2 | 64000 | 16000 | 500 ml | 64000 | 1000 ml |
| 0.4 | 64000 | 16000 | 510 ml | 64000 | 1000 ml |
| 0.6 | 64000 | 16000 | 500 ml | 64000 | 1000 ml |
| 0.8 | 64000 | 16000 | 450 ml | 48000 | 1000 ml |
| 1.0 | 64000 | 32000 | 600 ml | 64000 | 1000 ml |
| 2.0 | 64000 | 32000 | 620 ml | 64000 | 1000 ml |
| 3.0 | | | | 64000 | 1000 ml |
| 4.0 | | | | 64000 | 1000 ml |

Virus suspension containing 30% sucrose in TRIS-EDTA buffer. Filters Stack: AP25+8.0+3.0+1.2+0.8+0.45+0.22. Fixed pressure (20 pds). Variable pressure (10 to 100 pds). Variable flow rate: Original flow rate at 20 pds. of air pressure is decreasing as the flow resistance of the membranes increases. Fixed flow rate: Original flow rate is maintained by increasing air pressure, up to 100 pds., when necessary.

Other experiments were carried out to elucidate the mechanism of action of filtration on Millipore membranes.

The technique of step filtrations was used. A total of 1000 ml of purified virus suspension containing 0.2 percent gelatine and 30 percent sucrose in the usual buffer was filtered in a stack of Millipore membranes identical to the one used in the preceding experiments. These membranes were all 142 mm. in diameter. The flow was kept constant by increasing the air pressure when needed. The filtered virus was sampled in lots of 200 ml. Aliquots HA filtration shows that in the first 200 ml. sample the HA titer of the filtrate decreases. Then after 400 ml. this titer increases over the titer of the original virus. By the end of the filtration, the titer comes back to the original titer. These results are shown in graphic form in FIG. 1 of the drawings and in Table 2.

TABLE 2

Mechanism of action in filtration on Millipore membranes.
200 ml step filtration under positive air pressure.
Flow rate stabilized by increasing air pressure.
Filter membranes stacked as in TABLE 6

| Step Number | Volume filtered | HA titer After filtration |
|---|---|---|
| 1 | 200 ml | 4096 HA/ml |
| 2 | 200 ml | 8192 HA/ml |
| 3 | 200 ml | 96000 HA/ml |
| 4 | 200 ml | 96000 HA/ml |
| 5 | 200 ml | 64000 HA/ml |
| Original | 1000 ml | 64000 HA/ml |

It is remarkable that the peak of the curve coincides approximately with the point where during filtration at constant pressure, the flow rate of the viral suspension drops to nothing. From the beginning of the filtration up to this point there is an accumulation of viruses in the membrane thus creating some resistance against the flow of virus. Then under increasing pressure this accumulated viral material is forced out of the membrane thus explaining the sudden increase of titer in the peak. When using gelatine there is thus no irreversible adsorption on the membrane.

Another experiment was carried out as follows:

The same suspension as used in the preceding experiments was filtered over a Millipore press of 293 mm diameter. The stack of pre-filter and filtering membranes is also the same, except for the diameter.

Before filtering, gelatine (DIFCO) is added to the virus suspension until the final concentration is 0.2 percent, Merthiolate is also added to the same concentration i.e., 1/10,000.

The virus suspension is thereafter introduced in a cylindrical reservoir which can resist a pressure of at least 100 pounds per square inch.

The reservoir is connected to a 293 mm. Millipore press by means of a reinforced rubber tube which can withstand the above pressure.

Filtration is initiated by producing a pressure with compressed air in the reservoir which contains the virus suspension. There comes a moment when under a minimum predetermined pressure (about 10 to 20 pounds) which is obtained by operating a valve for introducing compressed air the flow of the virus suspension reaches a fast rate. Once the latter has been established, it is necessary to keep it constant by operating the valve, in order to gradually raise the pressure of air when the flow rate tends to decrease. Once the virus suspension has been filtered it is stored in a sterile reservoir where it is kept at a temperature of 4°C until final dilution.

Though the invention has been illustrated by using a virus suspension it is obvious that any protein suspension can be filtered using the process according to the present invention. It is also understood that the operating conditions can vary within a broad range without departing from the scope of the present invention.

I claim:

1. A process for the filtration of a suspension containing an influenza virus, which comprises adding from 0.1 to 4 percent by weight of gelatine to the suspension having a pH of about 7.8, and filtering the gelatine containing suspension through a filtering press containing a stack of membranes primarily composed of cellulose derivatives having a pore size of from $8.0\mu m$ to $0.22\mu m$ arranged in order of decreasing porosities in the direction of fluid flow; said stack of membranes being covered by a pre-filter, and keeping a constant flow rate of the gelatine containing suspension which is being filtered by applying increasing air pressure to the gelatine containing suspension.

2. The process of claim 1 wherein said amounts of gelatine vary between, 0.1 and 2.0 percent by weight.

3. Process according to claim 1, wherein said gelatine is added in amounts of 0.2 percent by weight.

4. Process according to claim 1, wherein said suspension contains about 25 to 35 percent sucrose.

5. Process according to claim 1, wherein said air pressure is increased from 10 to 100 pounds per square inch.

6. Process according to claim 4, wherein sodium ethyl mercurithiosalicylate is added to said suspension prior to said filtering.

7. Process according to claim 1, wherein said sodium ethyl mercurithiosalicylate is added until a final concentration of 1/10,000 is reached.

8. Process according to claim 1, wherein said pre-filter is a glass-wool pre-filter.

9. Process according to claim 1, wherein the membranes have a diameter between about 140 and 300 mm.

10. Process accroding to claim 1, wherein the filtering press contains the following membranes disposed in order in the direction of fluid flow:
1— a glass wool pre-filter
2— a $8.0\mu m$ membrane
3— a $3.0\mu m$ membrane
4— a $1,2\mu m$ membrane
5— a $0.8\mu m$ membrane
6— a $0.45\mu m$ membrane.

11. Process for the filtration of a suspension containing an influenza virus vaccine, about 30 percent sucrose and tris(hydroxymethyl) aminoethane-ethylene diamine tetraacetic acid buffer, which comprises adding about 0.2 percent by weight of gelatine to said suspension, having a pH of about 7.8 thereafter adding sodium ethyl mercurithiosalicylate to the gelatine containing suspension until a final concentration of 1/10,000 is obtained, filtering the suspension over a filtering press having a diameter between about 140 and 300mm containing the following membranes, primarily composed of cellulose derivatives arranged in order of decreasing porosities in the direction of fluid flow:
1— a glass wool pre-filter
2— a $8.0\mu m$ membrane
3— a $3.0\mu m$ membrane
4— a $1.2\mu m$ membrane
5— a $0.8\mu m$ membrane
6— a $0.45\mu m$ membrane
7— a $0.22\mu m$ membrane
and keeping a constant flow rate of the gelatine containing suspension which is being filtered by applying increasing amounts of air pressure of from about 10 to about 100 pounds per square inch to said gelatine containing suspension.

* * * * *